US012602237B2

(12) United States Patent
Foo et al.

(10) Patent No.: US 12,602,237 B2
(45) Date of Patent: Apr. 14, 2026

(54) USER INTERFACE EXTENDABILITY OVER WIRELESS PROTOCOL

(71) Applicant: Apple Inc., Cupertino, CA (US)

(72) Inventors: Jeremy Jie You Foo, San Jose, CA (US); Matthew M. Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/805,462

(22) Filed: Jun. 5, 2022

(65) Prior Publication Data

US 2023/0393862 A1     Dec. 7, 2023

(51) Int. Cl.
*G06F 9/451*          (2018.01)

(52) U.S. Cl.
CPC .................................... *G06F 9/451* (2018.02)

(58) Field of Classification Search
CPC ...................................................... G06F 9/451
See application file for complete search history.

(56) References Cited

U.S. PATENT DOCUMENTS

| | | | | | |
|---|---|---|---|---|---|
| 7,771,320 | B2 * | 8/2010 | Riley | ...................... | G16H 20/30 |
| | | | | | 434/238 |
| 8,818,898 | B2 * | 8/2014 | Schlossberg | ........... | G06Q 30/02 |
| | | | | | 705/344 |
| 10,231,033 | B1 * | 3/2019 | Bumgarner | ........ | H04N 21/8547 |

| | | | | | |
|---|---|---|---|---|---|
| 2003/0142038 | A1 * | 7/2003 | Folk, II | .............. | H04N 7/17318 |
| | | | | | 348/E7.071 |
| 2004/0012717 | A1 * | 1/2004 | Sprague | .................. | G06F 9/451 |
| | | | | | 348/588 |
| 2004/0119728 | A1 * | 6/2004 | Blanco | ................... | H04N 9/641 |
| | | | | | 345/629 |
| 2008/0244426 | A1 * | 10/2008 | Klask | .................. | G06F 9/45512 |
| | | | | | 715/764 |
| 2010/0014825 | A1 * | 1/2010 | Curtis | .................... | G11B 27/10 |
| | | | | | 386/200 |
| 2010/0037249 | A1 * | 2/2010 | Sedeffow | ......... | H04N 21/25825 |
| | | | | | 375/E7.076 |
| 2010/0242070 | A1 * | 9/2010 | Matsubayashi | .... | H04N 21/4532 |
| | | | | | 348/584 |
| 2011/0003665 | A1 * | 1/2011 | Burton | ................ | G06F 13/4282 |
| | | | | | 482/8 |
| 2011/0074794 | A1 * | 3/2011 | Felt | ................... | H04N 21/41265 |
| | | | | | 345/520 |
| 2012/0185905 | A1 * | 7/2012 | Kelley | ............... | H04N 21/8153 |
| | | | | | 348/E9.055 |
| 2013/0050230 | A1 * | 2/2013 | Jeong | .................... | G06F 3/1454 |
| | | | | | 345/522 |
| 2013/0076980 | A1 * | 3/2013 | Oren | .................. | H04N 21/4223 |
| | | | | | 348/E5.009 |
| 2013/0135115 | A1 * | 5/2013 | Johnson | .............. | H04W 56/001 |
| | | | | | 340/870.02 |
| 2015/0007236 | A1 * | 1/2015 | Dureau | ............ | H04N 21/47217 |
| | | | | | 725/88 |

(Continued)

*Primary Examiner* — Eric J. Bycer
(74) *Attorney, Agent, or Firm* — Blank Rome LLP

(57)          ABSTRACT

Generating unified content includes receiving, at a first device, first media content comprising a media stream from one or more source devices, and receiving, at the first device, user interface overlay instructions. The first device generates unified content having the first media content and a user interface overlay, and provides the unified content for display on a display device.

14 Claims, 7 Drawing Sheets

(56) References Cited

U.S. PATENT DOCUMENTS

| | | | |
|---|---|---|---|
| 2015/0066173 A1* | 3/2015 | Ellis .................. | G09B 19/0092 |
| | | | 700/91 |
| 2016/0057488 A1* | 2/2016 | Smolic .............. | H04N 21/2353 |
| | | | 725/32 |
| 2016/0121161 A1 | 5/2016 | Mountain | |
| 2017/0034237 A1* | 2/2017 | Silver .................. | H04N 5/272 |
| 2019/0191203 A1* | 6/2019 | Asbun ................ | H04N 21/6587 |
| 2020/0314479 A1 | 10/2020 | Umansky | |

* cited by examiner

300

START

INITIATE PLAYBACK OF MEDIA ITEM — 305

INITIATE REMOTE PLAYBACK AT REMOTE DEVICE — 310

TRANSMIT INSTRUCTION TO INITIATE REMOTE PLAYBACK AT REMOTE DEVICE — 315

DETERMINE UI OVERLAY ELEMENTS FOR MEDIA STREAM — 320

DETERMINE DATA FOR UI OVERLAY ELEMENTS — 325

GENERATE UI OVERLAY INSTRUCTION — 330

INITIALIZE TRANSMISSION OF UI OVERLAY STREAM — 335

END

USER INTERFACE EXTENDABILITY OVER WIRELESS PROTOCOL

TECHNICAL FIELD

Embodiments described herein relate to content streaming. More particularly, embodiments described herein relate to providing a secondary data stream from which a user interface overlay may be generated.

BACKGROUND

Currently, services, such as fitness services, allow streaming of content onto a display device such as a mobile device, smart TV, or the like. Certain uses, such as health or fitness apps, may be enhanced by personal data that is not part of the app. Typically, a user may run an application on one device; and view corresponding personal information on a second device, such as a smart watch or other wearable device. However, this can be complicated and take away from the user experience with the application.

BRIEF DESCRIPTION OF THE DRAWINGS

Embodiments described herein are illustrated by examples and not limitations in the accompanying drawings, in which like references indicate similar features. Furthermore, in the drawings, some conventional details have been omitted, so as not to obscure the inventive concepts described herein.

DETAILED DESCRIPTION

This disclosure pertains to systems, methods, and computer readable media for infusing streamable content with a user interface (UI) overlay. In particular, this disclosure pertains to separately transmitting media content and UI overlay data to a receiving device in a manner such that the receiving device can generate a presentation including the streamed media content with the UI overlay. In some embodiments, the UI overlay is transmitted by a second data pipeline, separate from the media content, and is transmitted along with rendering instructions such that the receiving device can present the media content with the UI overlay according to the instructions.

Figure 1:
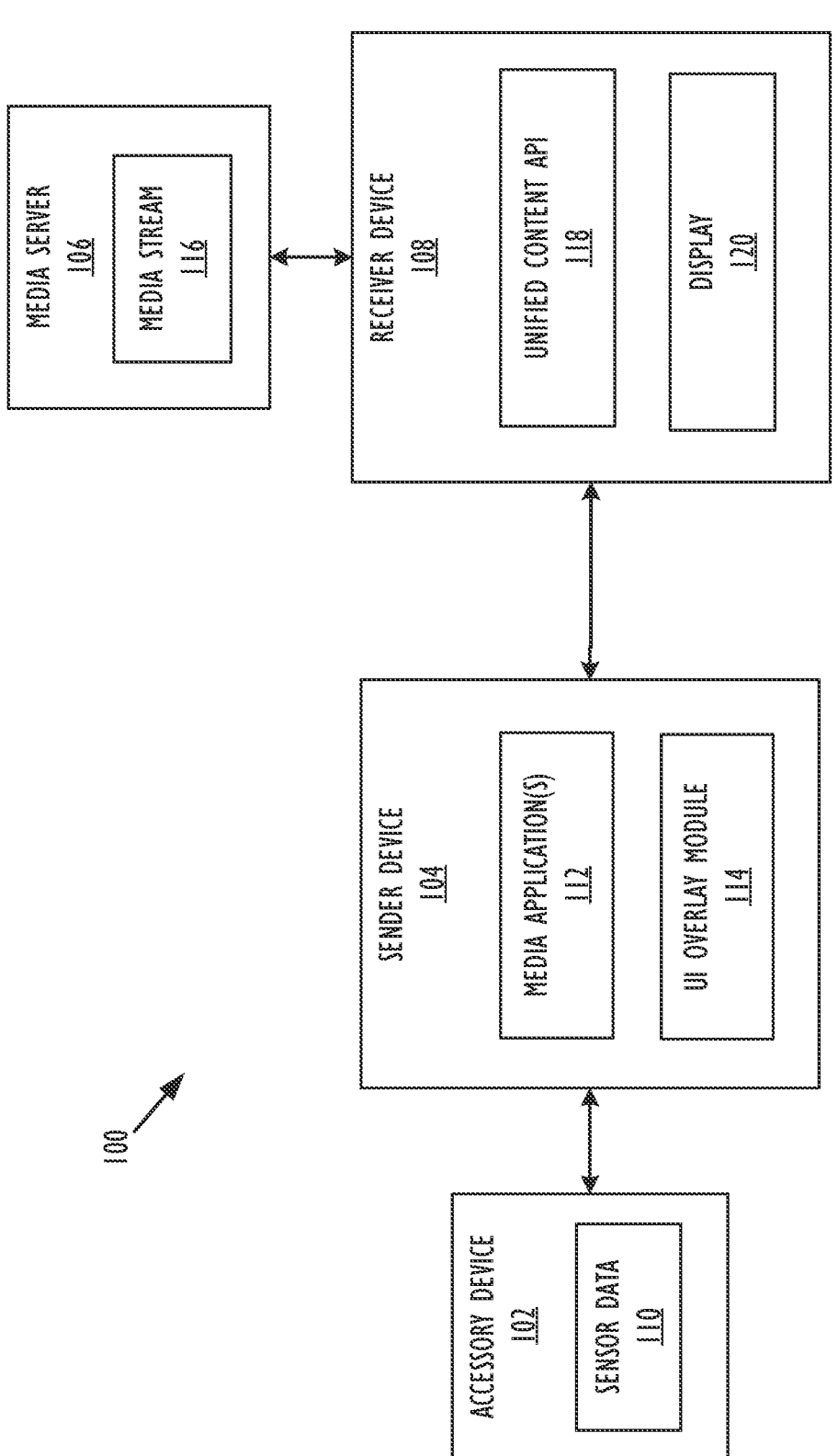
FIG. 1 illustrates a block architecture diagram for generating a UI overlay for a media stream, in accordance with one or more embodiments.

Turning to FIG. 1, the embodiments described herein can operate in one or more electronic devices operatively connected across one or more networks. As such, FIG. 1 illustrates a block architecture diagram for generating a UI overlay for a media stream, in accordance with one or more embodiments. It should be understood that the various components are presented in one potential configuration. In alternative embodiments, the various components and/or processes performed by the components may be differently distributed. Further, in some embodiments, some of the components and/or processes may be combined or performed by additional components not shown.

FIG. 1 includes a block architecture diagram 100 in which a media stream and a UI overlay stream are provided to a receiving device such that receiver device 108 can render a presentation of a unified media stream having media stream with the UI overlay rendered over the media stream such that the unified media stream appears as if the UI elements are embedded in the frames of the media stream. In some embodiments, the media stream 116 originates from a first source, such as media server 106, while the data for the UI overlay originates form a different device, such as the sender device 104. Alternatively, in some embodiments, the media stream 108 and UI data may originate from a same device, or may be transmitted from a same device, for example if the first remote device obtains the media stream from a remote server.

In some embodiments, a user may access one or more media application(s) on the sender device 102 to cause the media stream to be presented at the receiver device 108. According to some embodiments, the media application 112 can include instructions to cause a media stream to be presented on a selected remove device, such as the receiver device. The media application 112 can transmit an instruction to the receiver device 108 to initiate the media stream 116 from the media server. Additionally, or alternatively, the media application 112 may transmit an instruction to the media server 106 to initiate a transmission of the media stream 116 to the receiver device 108.

According to some embodiments, the sender device 104 may include a UI overlay module. In some embodiments, the UI overlay module 114 may be part of the media application(s) 112, or may be a separate application. In some embodiments, the UI overlay module 114 may generate instructions for rendering UI elements to be presented over the media stream. The UI overlay module 114 may generate rendering instructions from which the receiver device 108 can render the UI elements. The UI elements may be selected, for example, based on preprogrammed instructions as part of the media application(s) 112. Additionally, or alternatively, the UI elements may be determined based on user preference, or other instructions received by the sender device 104.

In some embodiments, the UI overlay module 114 may be configured to encode data in the UI overlay stream. For example, the sender device 104 may collect sensor data 110, such as health data, environmental data, or the like. The sender device 104 may collect the data locally, or from a remote device, such as accessory device 102, which may be a device communicably connected to the sender device, such as a wearable electronic device, mobile electronic device, and the like. The UI overlay module 114 is configured to generate and transmit instructions to render the UI overlay, including items to be rendered, as well as positional information and the like. For example, the UI overlay module 114 may instruct the receiver device 108 to display a UI element of a particular shape, position, size, and/or including particular data. In addition, the UI element may be a combination of shapes, text, and/or data, or the like. Thus, the UI overlay module 114 may incorporate the sensor data 110 as text and/or numerical data within thin the instructions for the UI element. The sender device 104 transmits the UI overlay instructions in a UI overlay transmission. As such, the UI overlay instructions are transmitted to the receiver device over a separate data pipeline than the media stream.

The receiver device 108 may include a unified content API 118 which is configured to receive the UI overlay transmission and the media stream 116, and renders a unified content stream. According to some embodiments, the unified content stream includes the media stream with the UI elements overlaid in accordance with the instructions received in the UI overlay transmission. Then, the unified content is displayed on a display device 120, or provides the unified content for display to a display device. Thus, the presentation of the unified content includes the media stream with the embedded UI elements.

According to some embodiments, the media stream and the UI elements are decoupled such that the unified content API 118 can generate a unified content media stream with the UI overlay based on the instructions from the UI overlay module 114. By way of the unified content API 118, embodiments herein provide a mechanism to allow applications to stream content on a receiver device infused with UI elements which may be generated and/or determined by a third-party application. Accordingly, users may receive a richer experience with the media content because it is enriched with additional data via the UI elements.

Figure 2:
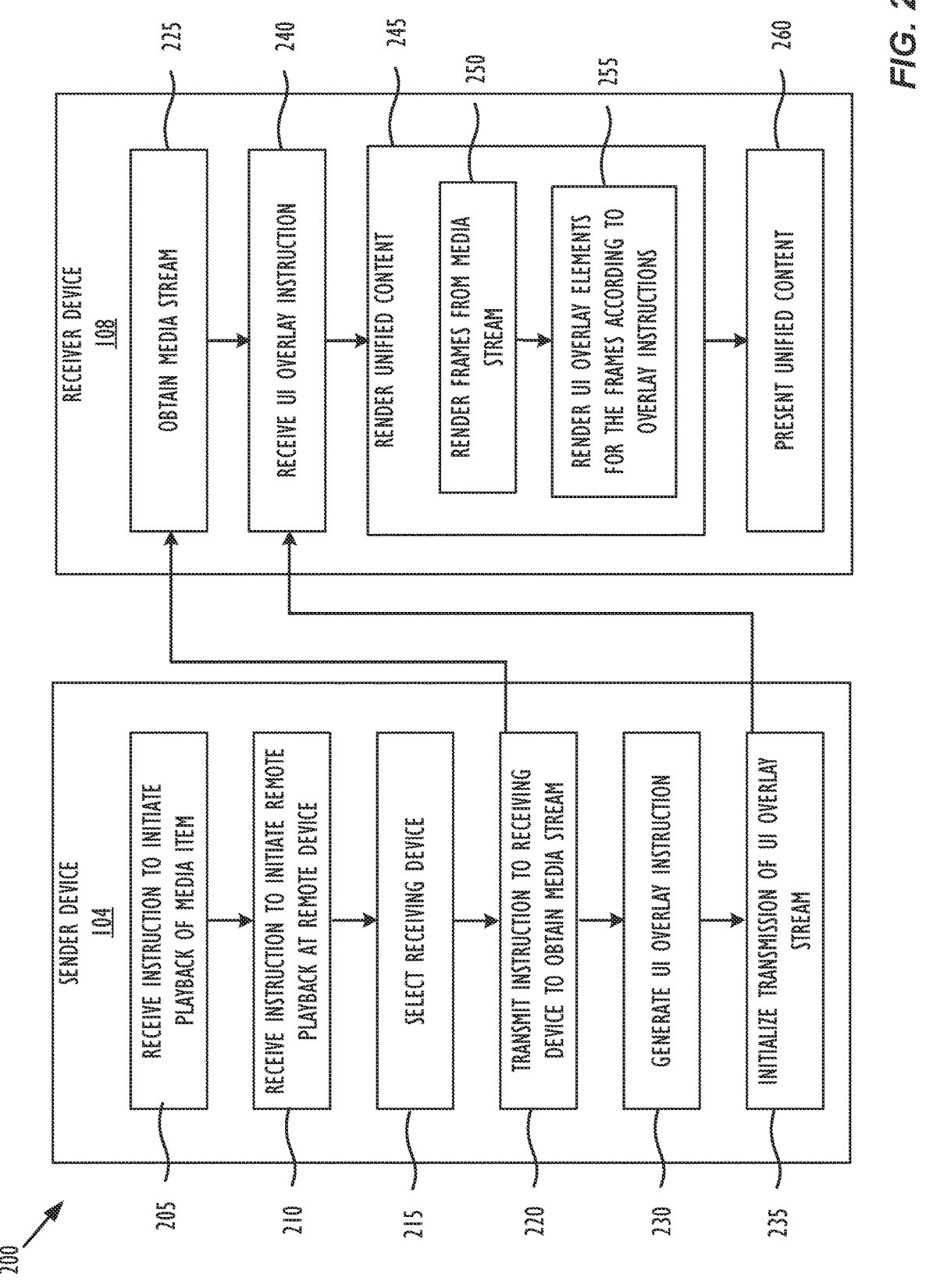
FIG. 2 illustrates, in flowchart form, a technique for generating a UI overlay for a media stream, in accordance with one or more embodiments.

FIG. 2 illustrates, in flowchart form, a technique for generating a UI overlay for a media stream, in accordance with one or more embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to the various components of FIG. 1. However, it should be understood that the various actions may be taken by alternative components, according to one or more embodiments.

The flowchart 200 begins at block 205 where the sender device 104 receives instructions to initiate playback of a media item. According to some embodiments, the media item may be selected through an app, such as a media app on the sender device 104. At block 210, the sender device 104 receives instructions to initiate remote playback at a remote device. According to one or more embodiments, the instruction may be received automatically, or through user input. For example, the media application may include a user interface component to cause a media stream to be presented at a remote device.

In response to receiving the request to initiate remote playback at a remote device, the sender device 104 may discover nearby receivers that are available and capable of rendering unified content. In some embodiments, a remote device may be automatically selected. Alternatively, the sender device 104 may present a set of options to the user for selection. Accordingly, at 215, a receiving device is selected, such as receiver device 108. At block 220, the sender device 104 transmits an instruction to the receiver device 108 to obtain the media stream. For example, in some embodiments, the instruction may indicate a location or device from which to receive the media stream. Thus, at 225, the receiver device 108 obtains the media stream. In some embodiments, the receiver device 108 receives media content from the sender device. Alternatively, the receiver device 108 may obtain the media stream from a device connected over a local network, may be accessed from a remote server, such as over the internet, or the like.

Returning to block 230, in addition to transmitting the instruction to obtain the media stream, the sender device 104 also generates UI overlay instructions. According to one or more embodiments, the UI overlay instructions include UI data. The UI data may describe one or more UI elements to be rendered for generating unified content. Then, at block 235 the sender device 104 initializes transmission of a UI overlay stream. The UI overlay stream may include the UI overlay instructions which instruct the receiver device 108 as to how and what to render as one or more overlay elements on the media stream.

The flowchart 200 continues at block 240, where the receiver device 108 receives the UI overlay instructions. Then, at block 245, the receiver device 108 renders the unified content. Rendering the unified content may include, at block 250, rendering frames from the media stream. Then, at block 255, rendering the UI overlay elements for the frames of the media stream according to the overlay instructions. The flowchart continues at block 260, where the receiver device presents the unified content. In some embodiments, the receiver device 108 includes a display device onto which the unified content is presented. Additionally, or alternatively, the receiver device 108 may be communicably connected to a separate display device to which the unified content can be transmitted for presentation.

Figure 3:
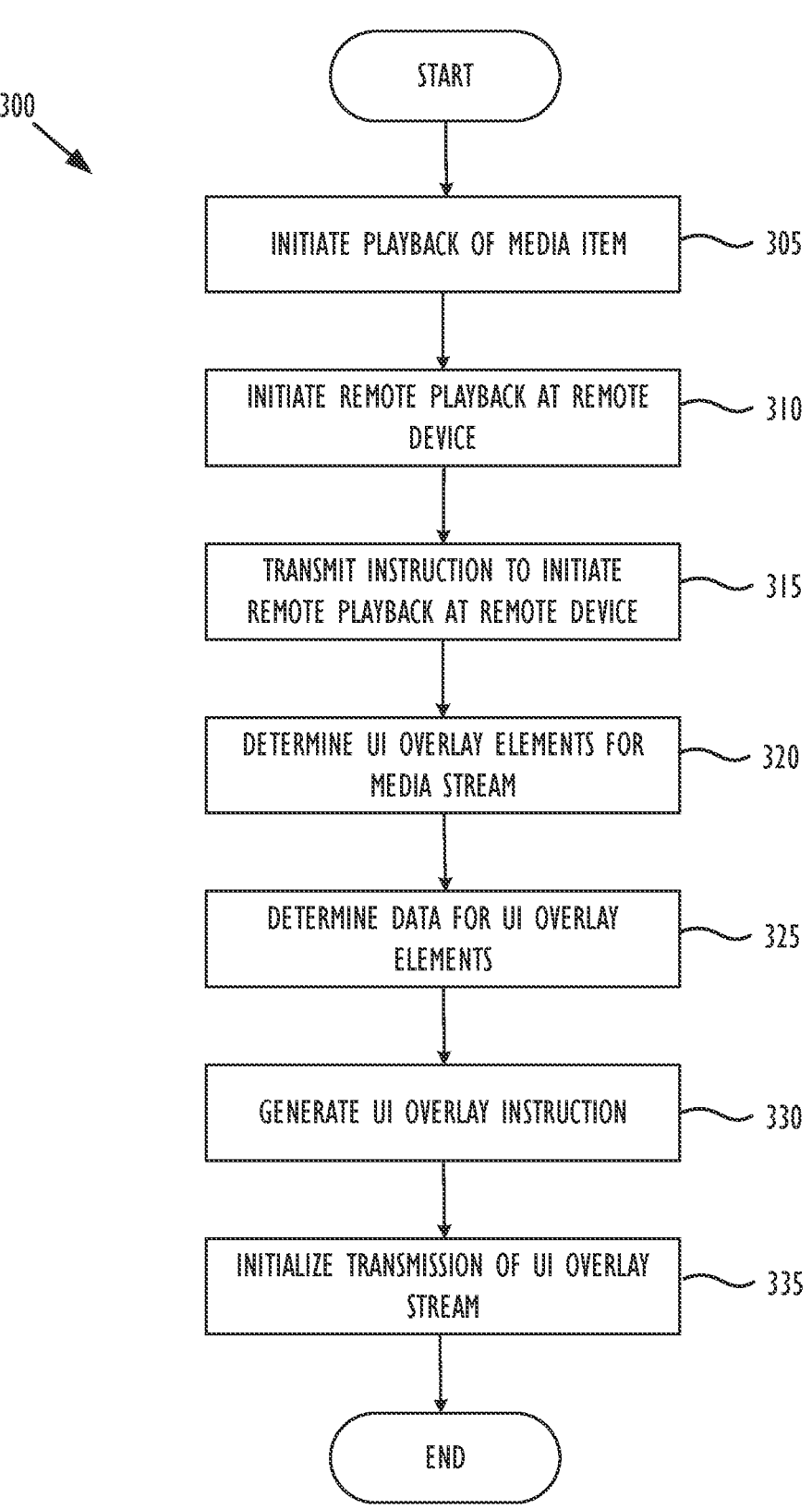
FIG. 3 illustrates, in flowchart form, a technique for transmitting unified content, in accordance with one or more embodiments.

According to some embodiments, the process of causing unified content to be presented by a remote device may be directed by an application which is present elsewhere in the system, such as the sender device 104, or in some embodiments the media server 106 or an accessory device 102. FIG. 3 illustrates, in flowchart form, a technique for transmitting unified content by an application, in accordance with one or more embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to the various components of FIG. 1. However, it should be understood that the various actions may be taken by alternative components, according to one or more embodiments. Further, in some embodiments, some or all of the processes described in FIG. 3 may be performed in conjunction with the various processes described above with respect to FIG. 2. As such, the various steps and processes may be described in a truncated manner separately in each of FIGS. 2 and 3 for purposes of clarify, but can be combined in various combinations in some embodiments.

The flowchart 300 begins at block 305 where the playback of a media item is initiated. Initiating playback of the media item may include initiating a media stream. In some embodiments, the media stream may be initiated by an application, such as a media application 112 sending an instruction to initiate the transmission. The media application 112 or other module initiating the application may run on the sender device 104, or alternatively on accessory device 102, or other network device communicably connected to a receiver device. According to some embodiments, the media stream may initially be streamed to a user device, from a media server 106 and may be initially presented at the user device, such as sender device 104 or accessory device 102, for example through a media application 112. Alternatively, a media item may simply be selected without playback being initiated at a user device.

The flowchart proceeds to block 310 where remote playback is initiated at the remote device. In some embodiments, a media application 112 on the user device may include an interface for presenting optional receiver devices that are capable of receiving the media stream and generating unified content. For example, the user interface may include a list of available devices which are enabled with the unified content API 118. The devices may include, for example, mobile phones, computers, tablets, wearable devices, smart televisions, as well as smart home devices and other network devices which can transmit media content to a display device. A user may select a device to receive the media stream, such as receiver device 108.

At block 315, the app transmits an instruction to the selected receiver device 108 to obtain the media stream. For example, in some embodiments, the instruction may indicate a location or device from which to receive the media stream. Additionally, or alternatively, the app may transmit an indication to the receiver device to receive the media stream from the local device. Thus, the receiver device 108 can initiate the media stream.

The flowchart 300 continues at block 320 where the app determines UI overlay elements to overlay on the media stream. The UI overlay elements may include items such as containers, predefined shapes such as boxes or rings, text or image components, or a combination thereof. The UI overlay elements for a particular data stream may be indicated by the media app, may be selected by a user device, or the like. For example, the UI overlay elements may be selected to mirror how the elements would appear if the media stream were presented by a local media app on the local device, such as by investigating a display tree for the user interface for the media app and translating the media tree into UI overlay elements. The UI overlay elements may be based on a media type, media category, or the like.

At block 325, the application determines data needed for the UI overlay elements if additional data is needed. In some embodiments, the data may include health data, fitness data, environmental data, sensor data, or the like. The data for the UI overlay elements may be obtained locally, for example from device data or from sensor data gathered from the device. In some embodiments, sensor data may be gathered from remote devices, such as accessory device 102. Further, in some embodiments, the type of data may simply be determined by the app such that the receiver device can be instructed to obtain the data for rendering the UI overlay elements. However, in some embodiments, additional data may not be required for a particular UI overlay element.

The flowchart continues at block 330 where the app generates UI overlay instructions. In some embodiments, the media app 112 may be encoded with the functionality described above with respect to the UI overlay module 114, or the media app 114 may signal the UI overlay module 114 to perform the processes to generate the UI overlay instructions. According to some embodiments, the UI overlay instructions include UI overlay data. The UI overlay data may describe one or more UI overlay elements to be rendered for generating unified content. That is, the UI overlay data may comprise a set of commands to draw the particular elements, such as containers, predefined shapes such as boxes or rings, text or image components, or a combination thereof. As an example, if the UI overlay element includes a metrics box that includes a heart rate read from a smart watch connected to the sender device, then the UI overlay data may include instructions to draw a box in a particular location on the screen that is directly connected to the receiver device 108, then the UI overlay instructions may instruct the receiver device to insert text in that box that reads, for example, "120 bpm." Functionally, the sender device 104 can read the sensor data from the accessory device (or locally, if the sender device 104 tracks heart rate data), translates that data to text (i.e., "120 bpm"), and incorporates that text into the UI overlay instructions.

In some embodiments, the UI overlay module 114 may include in the UI overlay data instructions to the receiver device 108 to obtain data from a separate source for incorporating into the UI overlay elements. As an alternative to the previous example, if the smart watch is directly connected to the receiver device 108, then the UI overlay instructions may instruct the receiver device to insert text corresponding to data obtained by the receiver device 108.

The flowchart 300 concludes at block 335, where the sender device 104 initializes transmission of a UI overlay stream. The UI overlay stream may include the UI overlay instructions which instruct the receiver device 108 as to how and what to render as one or more overlay elements on the media stream, as described above.

Figure 4:
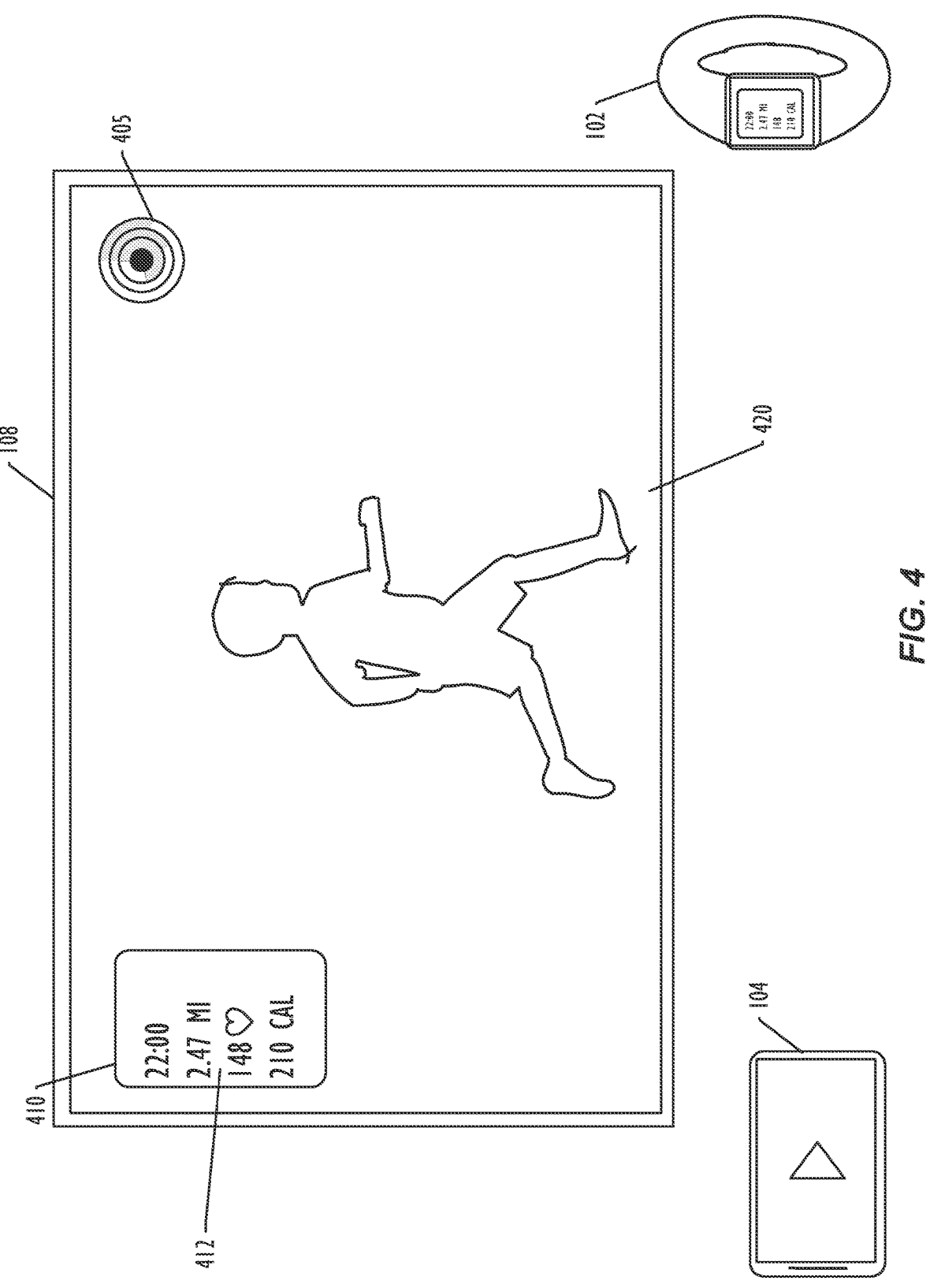
FIG. 4 illustrates an example user interface, in accordance with one or more embodiments.

FIG. 4 illustrates an example user interface, in accordance with one or more embodiments. In particular, FIG. 4 shows an example user interface displaying unified content on a receiving device 108, where the unified content comes from two example devices, such as sender device 104 and accessory device 102.

According to one or more embodiments, the sender device 104 can be a user device on which a user interacts with an application, such as a media application, to cause remote playback of a media item on a receiver device 108. As described above, in some embodiments, the media content can be an end user device, such as a mobile device, laptop, desktop computer, wearable device, and the like. The sender device can cause a media item to be streamed to a remove device. As such, the sender device 104 may instruct the receiver device 108 to receive and/or otherwise obtain a media stream. In the example shown, a fitness application may be accessed by a user on the sender device 104. The fitness application may provide an interface to allow a user to stream a workout in the form of a media stream. The user can select to view the workout media stream on the receiver device 108, which causes the sender device 104 to instruct the receiver device 108 to obtain the media stream for the workout, for example from a fitness server. Thus, the receiver device 108 can display the media stream for the workout. Although not shown, in some embodiments, the receiver device may be a separate computing device from the display device, such as a network device connected to a television. In these embodiments, the receiver device may not itself include a display, and may transmit the media stream for presentation on a communicably connected display device.

In addition, the sender device 104 can generate UI overlay instructions for the receiver device 108 which instruct the receiver device 108 to render the UI overlay elements over the media stream. In some embodiments, the UI overlay elements may be selected by a user, and/or may be indicated by an app on the sender device, such as a fitness app in the current example. As shown, the sender device 104 instructs the receiver device 108 to render two UI overlay elements. For the first UI overlay element 410, the UI overlay instructions may instruct the receiver device 108 to draw a box at a particular location in the top left corner. The UI overlay instructions may also direct the receiver device 108 to insert text in the box that reads: "22:00; 2.47 MI; 148; 210 CAL." In some embodiments, the text that is provided in the UI data stream may be based on device data or sensor data from the sender device 104, or another device communicably connected to the sender device 104. For example, the smart watch accessory device 102 may include sensor data and other fitness data to be included in the UI overlay element. As such, the UI overlay element may include a graphical representation of data. In this example, the sender device 104 can collect that data, extract the text (i.e., alphanumeric characters, etc.) from the data stream, and encode the text into the UI data stream. In this example, the UI data stream would additionally include instructions for a second UI overlay element 405. The UI overlay instructions for the second UI overlay element 405 may instruct the receiver device 108 to draw a set of three concentric rings in a particular location at the top right corner of the screen, with a particular portion of each concentric ring shaded. In some embodiments, the receiver device 108 may include a UI overlay API which is configured to draw predetermined shapes or components, such as boxes, rings, containers, and the like, as described in the UI data stream.

In some embodiments, the sender device can be a simplified version of a media app, for example a fitness app on the accessory device 102 which is configured to communicate with a fitness server and the receiver device 108, but which may not have the ability to stream the media stream directly to the device. In these embodiments, the accessory device may include a UI overlay module which triggers the receiver device 108 to obtain a media stream from a server, and also generates and sends the UI data stream to the receiver device 108 based on locally connected data.

In some embodiments, the UI overlay API may be configured to build a UI element from the UI overlay instructions, as well as other sources. For example, in some embodiments, the accessory device 102 may be communicably connected to the receiver device 108 separate from, or in addition to, the sender device 104. In these embodiments, the UI overlay module at the sender device 104 may generate an instruction in the UI overlay instructions to obtain data from a secondary source to insert into the UI overlay element. In the current example diagram, the UI overlay API at the receiver device 108 may read the instructions to draw a box at a particular location in the top left corner. The UI overlay instructions may also direct the receiver device 108 to insert text in the box, where the text should be obtained from data received from the accessory device 102. Thus, the text that reads "22:00; 2.47 MI; 148; 210 CAL" may come from a sensor data stream received by the receiver device 108, which the receiver device translates into text for presentation in the UI overlay element in accordance with the instructions.

Figure 5:
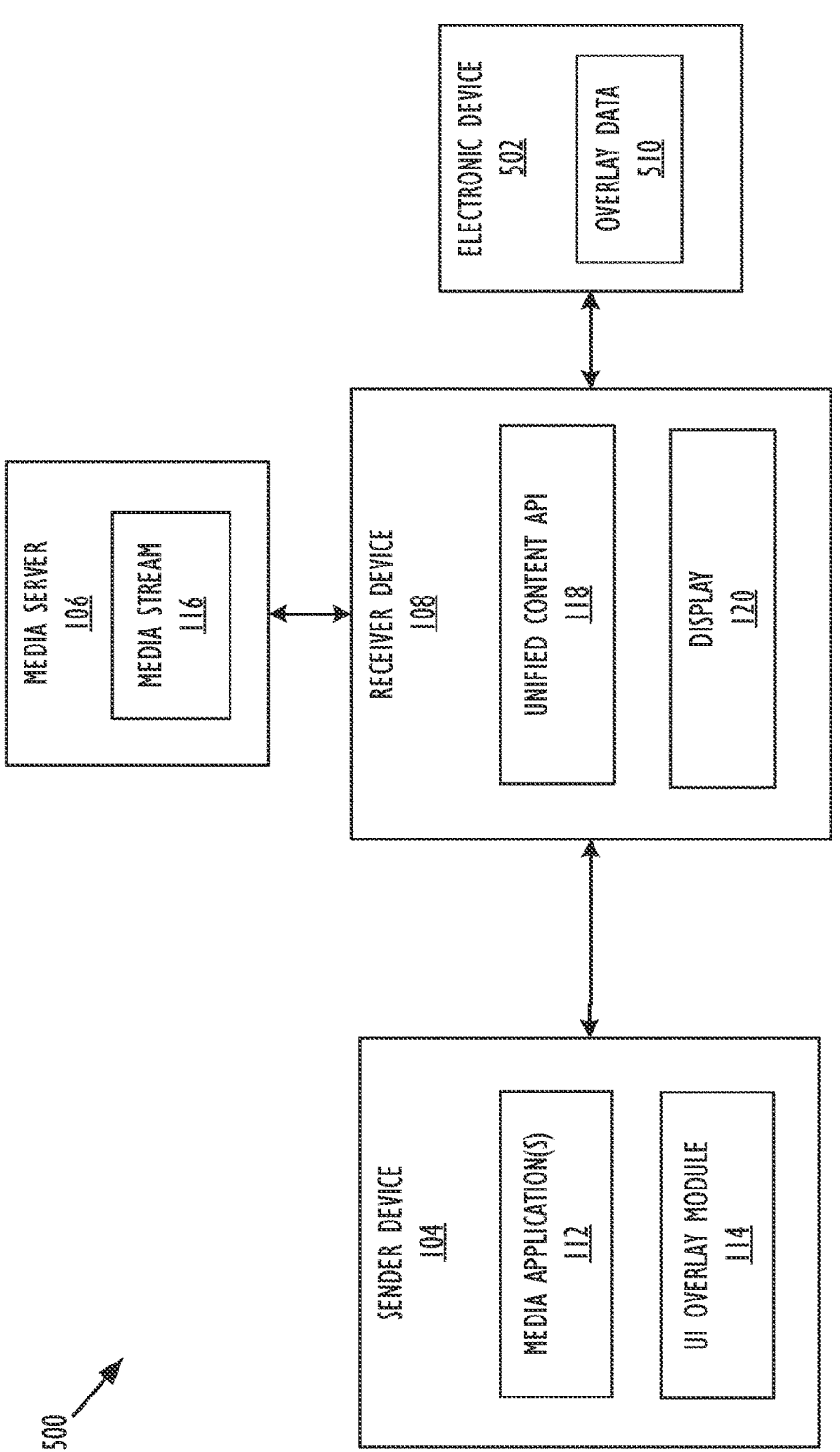
FIG. 5 illustrates an alternate block architecture diagram for generating a UI overlay for a media stream, in accordance with one or more embodiments.

FIG. 5 illustrates an alternate block architecture diagram for generating a UI overlay for a media stream, in accordance with one or more embodiments. As described above, in some embodiments, the unified content API 118 may be configured to read and perform the instructions in the UI overlay stream to incorporate elements from other sources. For example, in some embodiments, the UI overlay data may instruct the receiver device 108 to incorporate text or other items into the UI overlay element based on data obtained from the receiver device 108 and/or other devices communicably coupled to the receiver device 108.

For purposes of this example block architecture diagram, 500, a media stream 116 is presented with a UI overlay such that a receiver device 108 can render a presentation of a unified media stream having the UI overlay. In some embodiments, the media stream 116 originates from a first source, such as media server 106, while the data for the UI overlay originates form a different device, such as the sender device 104. Alternatively, in some embodiments, the media stream 108 and UI data may originate from a same device, or may be transmitted from a same device, for example if the first remote device obtains the media stream from a remote server.

In some embodiments, a user may access one or more media application(s) 112 on the sender device 104 to cause the media stream to be presented at the receiver device 108. According to some embodiments, the media application 112 can include instructions to cause a media stream to be presented on a selected remove device, such as the receiver device 108. The media application 112 can transmit an instruction to the receiver device 108 to initiate the media stream 116 from the media server. Additionally, or alternatively, the media application 112 may transmit an instruction to the media server 106 to initiate a transmission of the media stream 116 to the receiver device 108.

According to some embodiments, the sender device 104 may include a UI overlay module. In some embodiments, the UI overlay module 114 may be part of the media application(s) 112, or may be a separate application. In some embodiments, the UI overlay module 114 may generate instructions for rendering UI elements to be presented over the media stream. The UI overlay module 114 may generate rendering instructions from which the receiver device 108 can render the UI elements. The UI elements may be selected, for example, based on preprogrammed instructions as part of the media application(s) 112. Additionally, or alternatively, the UI elements may be determined based on user preference, or other instructions received by the sender device 104. For purposes of this example, the UI overlay module 114 may generate UI overlay instructions that indicate additional data to be gathered and embedded in the UI overlay elements by the receiver device. For example, the UI overlay module 114 may include an instruction to enter text in a UI overlay element that is translated from a data stream of overlay data 510 from an electronic device 502 operatively connected to the receiver device 108. In some embodiments, the electronic device 502 may be an accessory device, a wearable device, a mobile device, a base station, a laptop computer, desktop computer, network device, or the like. The overlay data 510 may include any kind of data which may be presented within a UI overlay element, such as health data, fitness data, sensor data, environmental data, personal data, device data, additional media data, or the like.

The receiver device 108 may include a unified content API 118 which is configured to receive the UI overlay transmission and the media stream 116, and renders a unified content stream. In the embodiments described in FIG. 5, the unified content API may embed text or other elements in the UI overlay elements which is generated by the local device or another device. According to some embodiments, the unified content stream includes the media stream rendered with the UI elements overlaid in accordance with the instructions received in the UI overlay transmission, and data received from devices communicably connected to the sender device 104 and/or the receiver device 108. Then, the unified content is displayed on a display device 120, or provided for display to a separate display device. Thus, the presentation of the unified content includes the media stream with the embedded UI elements.

According to some embodiments, the media stream, the UI overlay elements, and content within the UI elements are further decoupled such that the unified content API 118 can generate a unified content media stream with the UI overlay based on the instructions from the UI overlay module 114. By way of the unified content API 118, embodiments herein provide a mechanism to allow applications to stream content on a receiver device infused with UI elements which may be generated and/or determined by a third-party application, and/or from data received from multiple sources. Accordingly, users may receive a richer experience with the media content because it is enriched with additional data via the UI elements.

Figure 6:
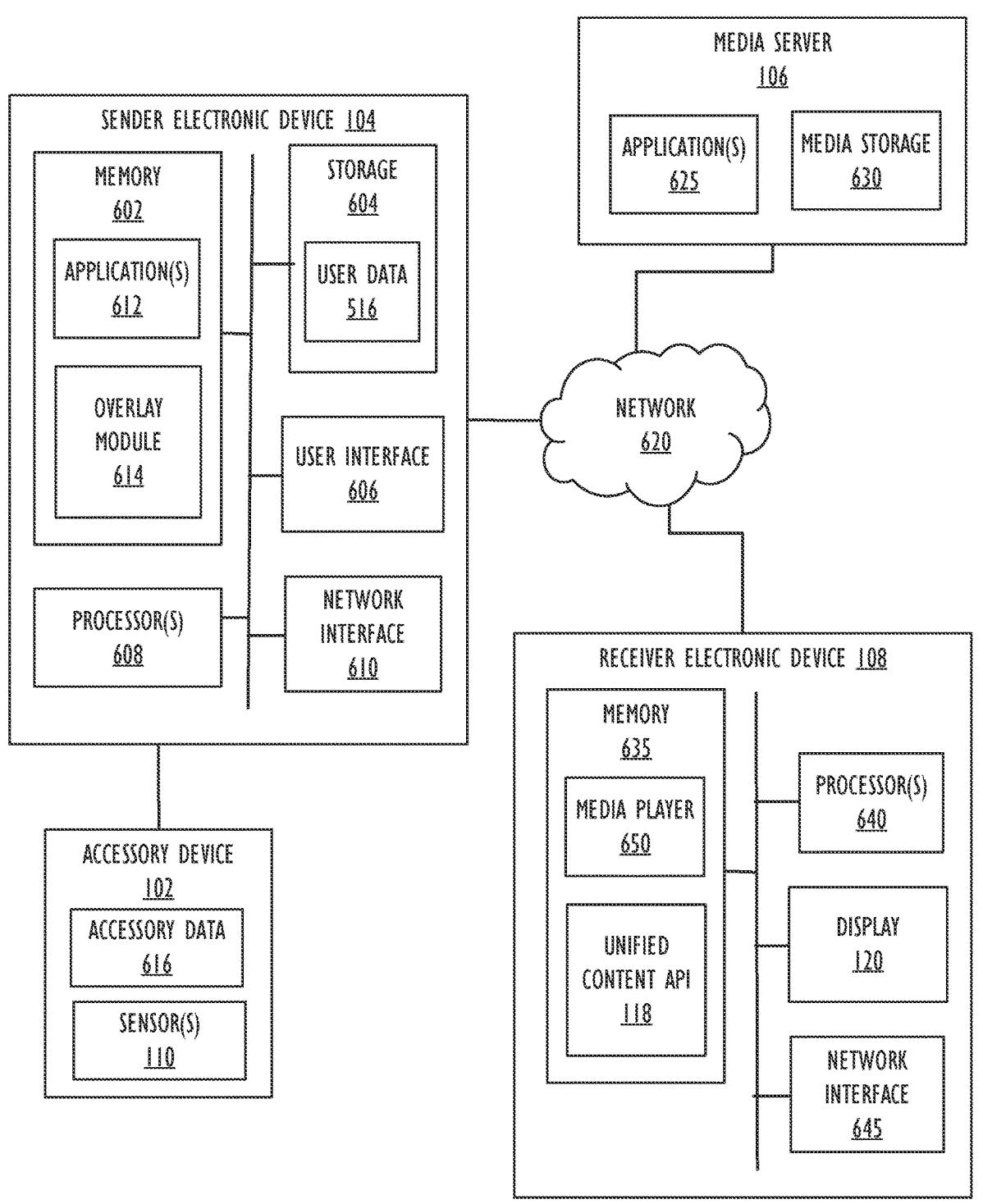
FIG. 6 illustrates, in block diagram form, a network diagram in which unified content can be generated and presented, according to one or more embodiments.

FIG. 6 illustrates, in block diagram form, a network diagram in which unified content can be generated and presented, according to one or more embodiments. In some embodiments, the sender electronic device 104, receiver electronic device 108, and media server 106 are communicably connected across a network 620. Network 620 may include, for example, the internet, a wide area network, a local area network, or the like, or any combination thereof. Each of sender electronic device 104, receiver electronic device 108, and media server 106 may be an electronic device, in addition to accessory device 102, which is can take a variety of different forms (e.g., tablet computer such as an IPAD, smartphone such as an IPHONE, laptop computer, desktop computer, network media player such as an APPLE TV, game/entertainment system, wearable devices such as a head mounted device, watch, or the like, or other consumer electronic device).

According to one or more embodiments, sender electronic device 104 may be a user device configured to run one or more applications 612, such as a media application, as well as an overlay module 614. The applications 112 are processed by one or more processor(s) 608 from a memory 602. Processor(s) 608 may include one or more different kinds of processors, such as a central processing unit (CPU), graphical processing unit (GPU), and the like. In some embodiments, processor(s) 608 may be a system-on-chip. Memory 602 may include memory cache, read-only memory (ROM), and/or random-access memory (RAM). Storage 604 may store suitable data for performing the applications 112, such as user data 516 and other data. Storage 604 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Sender electronic device 104 may include a user interface 606 through which a user can interact with the application(s) 612. The user interface 606 can include input components, display components, audio components, and the like. Sender electronic device 104 also includes a network interface 610, over which the sender electronic device connects to other electronic devices.

In some embodiments, sender electronic device 104 is operatively connected to an accessory device 102. Accessory device 102 can include a mobile device, a wearable device, or other electronic device generating or providing accessory data 616 from which a UI overlay element may be generated. In some embodiments, the accessory data 616 may include user data, device data, and/or sensor data collected by sensor(s) 110. Sensor(s) 110 may include, for example, proximity sensor/ambient light sensor, accelerometer, gyroscope, health monitors, heart rate monitors, pedometers, environmental sensors, and the like.

According to some embodiments, the application(s) 612 may be communicably connected to the media server 106. The media server may host media items in a media storage

630 and other applications 625 which may be used to provide the media to devices across the network.

Sender electronic device 104 may additionally be connected to receiver electronic device 108. According to one or more embodiments, receiver electronic device 108 may be a user device configured to run one or more applications, such as media player 650, as well as a unified content API 118. The applications are processed by one or more processor(s) 640 from a memory 635. Processor(s) 640 may include one or more different kinds of processors, such as a central processing unit (CPU), graphical processing unit (GPU), and the like. In some embodiments, processor(s) 640 may be a system-on-chip. Memory 635 may include memory cache, read-only memory (ROM), and/or random-access memory (RAM). Receiver electronic device 108 may include a display 120, on which the unified content may be presented, for example by the media player 650. Additionally, or alternatively, the display 120 may belong to a separate electronic device communicably coupled to the receiver electronic device 108. Receiver electronic device 108 also includes a network interface 645, over which the sender electronic device connects to other electronic devices.

Figure 7:
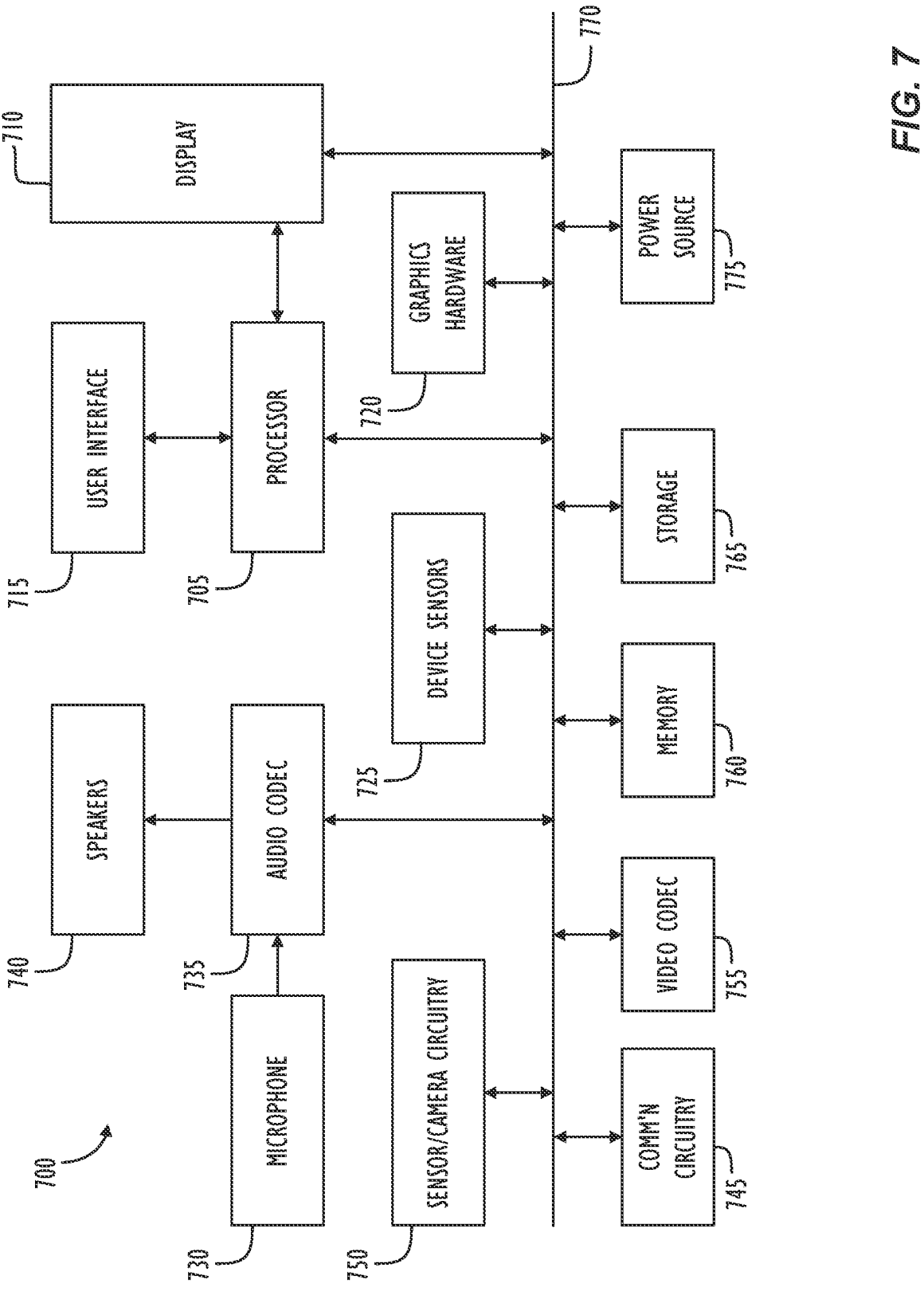
FIG. 7 illustrates a simplified functional block diagram of an illustrative programmable electronic device, in accordance with an embodiment.

Referring now to FIG. 7, a simplified functional block diagram of an illustrative electronic device 700 for providing access to an app store is shown, according to one embodiment. Electronic device 700 could be, for example, a mobile telephone, personal media device, portable camera, or a tablet, notebook, or desktop computer system. As shown, electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, image capture circuit or unit 750, which may, e.g., comprise multiple camera units/optical sensors having different characteristics (as well as camera units that are housed outside of, but in electronic communication with, device 700), video codec(s) 755, memory 760, storage 765, and communications bus 770.

Processor 705 may execute instructions necessary to carry out or control the operation of many functions performed by device 700 (e.g., such as the generation and/or processing of DAs in accordance with the various embodiments described herein). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream and/or indicate particular images(s) that the user would like to capture or share (e.g., by clicking on a physical or virtual button at the moment the desired image is being displayed on the device's display screen).

In one embodiment, display 710 may display a video stream as it is captured while processor 705 and/or graphics hardware 720 and/or image capture circuitry contemporaneously store the video stream (or individual image frames from the video stream) in memory 760 and/or storage 765. Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs).

Image capture circuitry 750 may comprise one or more camera units configured to capture images, e.g., in accordance with this disclosure. Output from image capture circuitry 750 may be processed, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random-access memory (RAM). Storage 765 may store media (e.g., audio, image, and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705, such computer program code may implement one or more of the methods described herein. Power source 775 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 700.

In the foregoing description, numerous specific details are set forth, such as specific configurations, properties, and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used herein to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing system, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program may be stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although operations or methods are described above in terms of some sequential operations, it should be appreciated that some of the operations described may be performed in a different order. Moreover, some operations may be performed in parallel, rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specification and drawings are, accordingly, to be regarded in an illustrative sense, rather than a restrictive sense.

In the development of any actual implementation of one or more of the disclosed concepts (e.g., such as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming, but may still be a routine undertaking for a person having ordinary skill in the art in the design and/or implementation of one or more of the inventive concepts set forth in the embodiments described herein.

As used in the description above and the claims below, the phrases "at least one of A, B, or C" and "one or more of A, B, or C" include A alone, B alone, C alone, a combination of A and B, a combination of B and C, a combination of A and C, and a combination of A, B, and C. That is, the phrases "at least one of A, B, or C" and "one or more of A, B, or C" means A, B, C, or any combination thereof, such that one or more of a group of elements consisting of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B, and/or C" is equal to "at least one of A, B, or C." Also, the use of "a" refers to "one or more" in the present disclosure.

What is claimed is:

1. A method for processing content, comprising:
receiving, at a first device, a playback request for a first media content comprising a media stream;
in response to the playback request:
transmitting an instruction to a receiver device to retrieve the media stream from a media server over a first data pipeline,
determining one or more user interface (UI) overlay elements for the media stream based on a local media application on the first device;
generating user interface overlay instructions for drawing the one or more UI overlay elements, and for retrieving sensor data from an accessory device; and
transmitting a UI overlay stream over a second data pipeline comprising the user interface overlay instructions to the receiver device,
wherein the user interface overlay instructions comprise instructions to render the one or more UI overlay elements over the media stream in accordance with the user interface overlay instructions, and instructions to populate the one or more UI overlay elements with the sensor data retrieved from the accessory device.

2. The method of claim 1, wherein the receiver device comprises a display device.

3. The method of claim 1, further comprising:
rendering unified content based on the user interface overlay instructions, and
transmitting the unified content to a display device for display.

4. The method of claim 1, wherein the first media content is received via a first data pipeline and the user interface overlay instructions are received via a second data pipeline.

5. The method of claim 1, wherein the user interface overlay instructions comprise instructions to draw a graphical representation of the sensor data.

6. A non-transitory computer readable medium comprising computer readable code for processing content, executable by one or more processors to:
receive, at a first device, a playback request for a first media content comprising a media stream;
in response to the playback request:
transmit an instruction to a receiver device to retrieve the media stream from a media server over a first data pipeline, determine one or more user interface (UI) overlay elements for the media stream based on a local media application on the first device;
generate user interface overlay instructions for drawing the one or more UI overlay elements, and for retrieving sensor data from an accessory device; and
transmit a UI overlay stream over a second data pipeline comprising the user interface overlay instructions to the receiver device,
wherein the user interface overlay instructions comprise instructions to render the one or more UI overlay elements over the media stream in accordance with the user interface overlay instructions, and instructions to populate the one or more UI overlay elements with the sensor data retrieved from the accessory device.

7. The non-transitory computer readable medium of claim 6, wherein the receiver device comprises a display device.

8. The non-transitory computer readable medium of claim 6, further comprising computer readable code executable by the one or more processors to:
render unified content based on the user interface overlay instructions, and
transmit the unified content to a display device for display.

9. The non-transitory computer readable medium of claim 6, wherein the first media content is received via a first data pipeline and the user interface overlay instructions are received via a second data pipeline.

10. The non-transitory computer readable medium of claim 6, wherein the user interface overlay instructions comprise instructions to draw a graphical representation of the sensor data.

11. A system comprising:
one or more processors; and
one or more computer readable media comprising computer readable code executable by the one or more processors to:
receive, at a first device, a playback request for a first media content comprising a media stream;
in response to the playback request:
transmit an instruction to a receiver device to retrieve the media stream from a media server over a first data pipeline,
determine one or more user interface (UI) overlay elements for the media stream based on a local media application on the first device;
generate user interface overlay instructions for drawing the one or more UI overlay elements, and for retrieving sensor data from an accessory device; and
transmit a UI overlay stream over a second data pipeline comprising the user interface overlay instructions to the receiver device,
wherein the user interface overlay instructions comprise instructions to render the one or more UI overlay elements over the media stream in accordance with the user interface overlay instructions, and instructions to populate the one or more UI overlay elements with the sensor data retrieved from the accessory device.

12. The system of claim 11, wherein the receiver device comprises a display device.

13. The system of claim 11, further comprising computer readable code executable by the one or more processors to:
render unified content based on the user interface overlay instructions, and
transmit the unified content to a display device for display.

14. The system of claim 11, wherein the first media content is received via a first data pipeline and the user interface overlay instructions are received via a second data pipeline.

* * * * *